(12) United States Patent
Zhang et al.

(10) Patent No.: US 7,272,220 B1
(45) Date of Patent: Sep. 18, 2007

(54) METHOD OF LOCATING AN IDLE MOBILE TELECOMMUNICATION DEVICE

(75) Inventors: Baoquan Zhang, Overland Park, KS (US); Von K. McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 446 days.

(21) Appl. No.: 10/090,526

(22) Filed: Mar. 4, 2002

(51) Int. Cl.
*H04M 7/00* (2006.01)
*H04Q 7/20* (2006.01)

(52) U.S. Cl. ............ 379/221.08; 379/221.09; 379/221.1; 455/456.2; 455/457; 455/426.1

(58) Field of Classification Search ............ 455/456.1, 455/456.2, 457, 426.1; 379/221.08, 221.09, 379/221.1, 221.11, 230
See application file for complete search history.

(56) References Cited

U.S. PATENT DOCUMENTS

| | | | | |
|---|---|---|---|---|
| 5,727,057 | A * | 3/1998 | Emery et al. | 379/201.07 |
| 5,963,861 | A * | 10/1999 | Hanson | 455/456.1 |
| 6,115,600 | A * | 9/2000 | Tuohino et al. | 455/405 |
| 6,330,454 | B1 * | 12/2001 | Verdonk | 455/456.2 |
| 6,716,101 | B1 * | 4/2004 | Meadows et al. | 455/456.1 |
| 2003/0119521 | A1 * | 6/2003 | Tipnis et al. | 455/456 |

* cited by examiner

Primary Examiner—George Eng
Assistant Examiner—Un C. Cho (57) ABSTRACT

Locating a lost or misplaced mobile station. A user may dial a designated number, enter the phone number of the misplaced or lost mobile, and the network responsively plays a message to the user informing the user of the geographic location of the cell and sector, typically including city and state information, as well as boundary information of the sector, such as street boundaries. In an alternative embodiment, a user may input the MIN of the lost mobile to a web-based form, and thereby retrieve a map of the cell-sector location of the MS. A service node (SN) is configured to receive a request from a user trying to locate a mobile device. The SN either prompts the user to provide the phone number of the mobile device via an IVRU or through a web-based form sent to a web server connected to the SN. The SN then initiates a call to the mobile device. The standard network processing of such a call includes sending a facilities available (FAVAIL) message to the service control point (SCP). The SCP identifies the call as a request to locate a mobile, and responsively provides location information to the calling SN. The SN in turn provides the location information to the user either by playing a voice message corresponding to the location information or by instructing a web server to provide a map of the location to the user over the world wide web. The method may include an authentication step to ensure that only authorized users are able to obtain location information.

18 Claims, 6 Drawing Sheets

METHOD OF LOCATING AN IDLE MOBILE TELECOMMUNICATION DEVICE

BACKGROUND OF THE INVENTION

1. Field of the Invention

The present invention relates to telecommunication services and more particularly to a method of locating an idle mobile telecommunication device.

2. Description of Related Art

Figure 1:
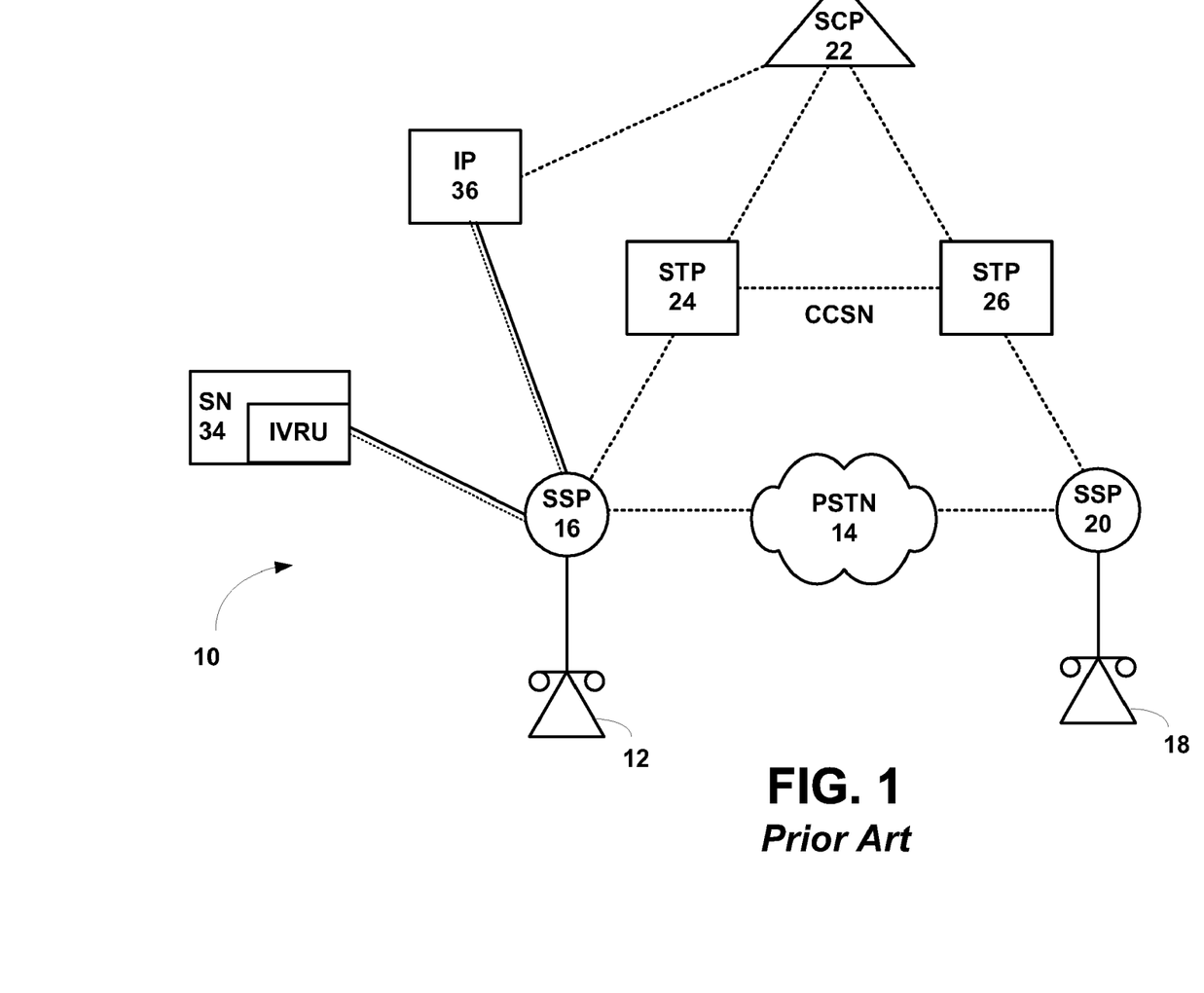
FIG. 1 is a prior art AIN network architecture.

A general example of an advanced intelligent network ("AIN") is depicted in FIG. 1 and is designated generally by reference numeral 10. In this figure, circuit-switched pathways (i.e., trunks) that carry voice and data are represented by solid lines, and signaling pathways and other logical connections are represented by dotted lines.

In exemplary network 10, a first station 12 is connected to the public switched telephone network ("PSTN") 14 via a first service switching point ("SSP") 16, and a second station 18 is connected to PSTN 14 via a second SSP 20. Stations 12 and 18 may be telephones, fax machines, modems, or other such devices. SSPs 16 and 20 are connected to each other and to a centralized service control point ("SCP") 22 by a signaling network that may include a first and second signal transfer points ("STP") 24 and 26. This signaling network carries out-of-band signals that are used to control the switches and to set up and tear down the circuit between the calling party and called party. Currently, Signaling System 7 ("SS7") is the most commonly used signaling system.

SCP 22 contains control information and call processing logic to assist SSPs 16 and 20 in handling calls. SSP 16 is programmed with logic that defines "trigger points" at which SSP 16 should seek guidance from SCP 22. At these trigger points, SSP 16 sends a query message to SCP 22, and SCP 22 returns a response message to SSP 16. According to SS7, these query and response messages are known as Transaction Capabilities Application Part ("TCAP") messages.

For example, SSP 16 may include a table that identifies a range of subscriber numbers associated with mobile telecommunication services, and SSP 16 may be programmed with a trigger that causes SSP 16 to query SCP 22 in response to a call origination or termination attempt involving one of those numbers. At that trigger point, SSP 16 would send a TCAP query to SCP 22, providing various parameters such as the calling number and the called number. In turn, SCP 22 would execute service logic to determine what SSP 16 should do with the call, and SCP 22 would then send a TCAP response back to SSP 16. The TCAP response may instruct SSP 16 to route the call to a particular destination or may provide various other instructions or information.

Alternatively, SSP 16 may itself be programmed with logic that indicates how to handle special service calls, without requiring SSP 16 to "dip" into the logic of SCP 22. For instance, in response to a call origination or termination attempt involving a particular number, SSP 16 may execute its own logic to determine what to do with the call. Internal tables and service logic programmed into SSP 16 may then instruct the SSP to route the call via a particular trunk group to a remote destination in the network.

On call origination, once an SSP receives routing instructions from SCP 22 or otherwise determines where in the network to route a call, the SSP may seek to set up a call with a switch serving the terminating location (an SSP or MSC), by engaging in an SS7 signaling session. According to SS7, call setup and tear down between switches is accomplished by a series of messages in the Integrated Services Digital Network User Part ("ISUP") layer. These messages include the initial address message ("IAM"), the address complete message ("ACM"), the answer message ("ANM"), the release message ("REL") and the release complete message ("RLC"), among others. The ISUP protocol is defined by ITU-T recommendations Q.761 and Q.764, as well as Bellcore GR-317 CORE and GR-394 CORE, all of which are fully incorporated herein by reference.

To set up a call from station 12 to station 18, SSP 16 first sends an IAM message to SSP 20 via STPs 24 and 26. The IAM message indicates that the originating switch has seized an outgoing circuit, and provides address information (such as the dialed number) and other parameters related to routing and handling of the call. In response, SSP 20 sends an ACM message to SSP 16, to acknowledge that all address signals required for routing the call to the called party have been received and that the call can be connected to station 18. When station 18 goes off hook to answer the call, SSP 20 sends an ANM message back to SSP 16 to signal that station 18 has answered. In response, SSP 16 connects the call to SSP 20, thereby establishing an end-to-end communication path between station 12 and station 18.

Figure 2:
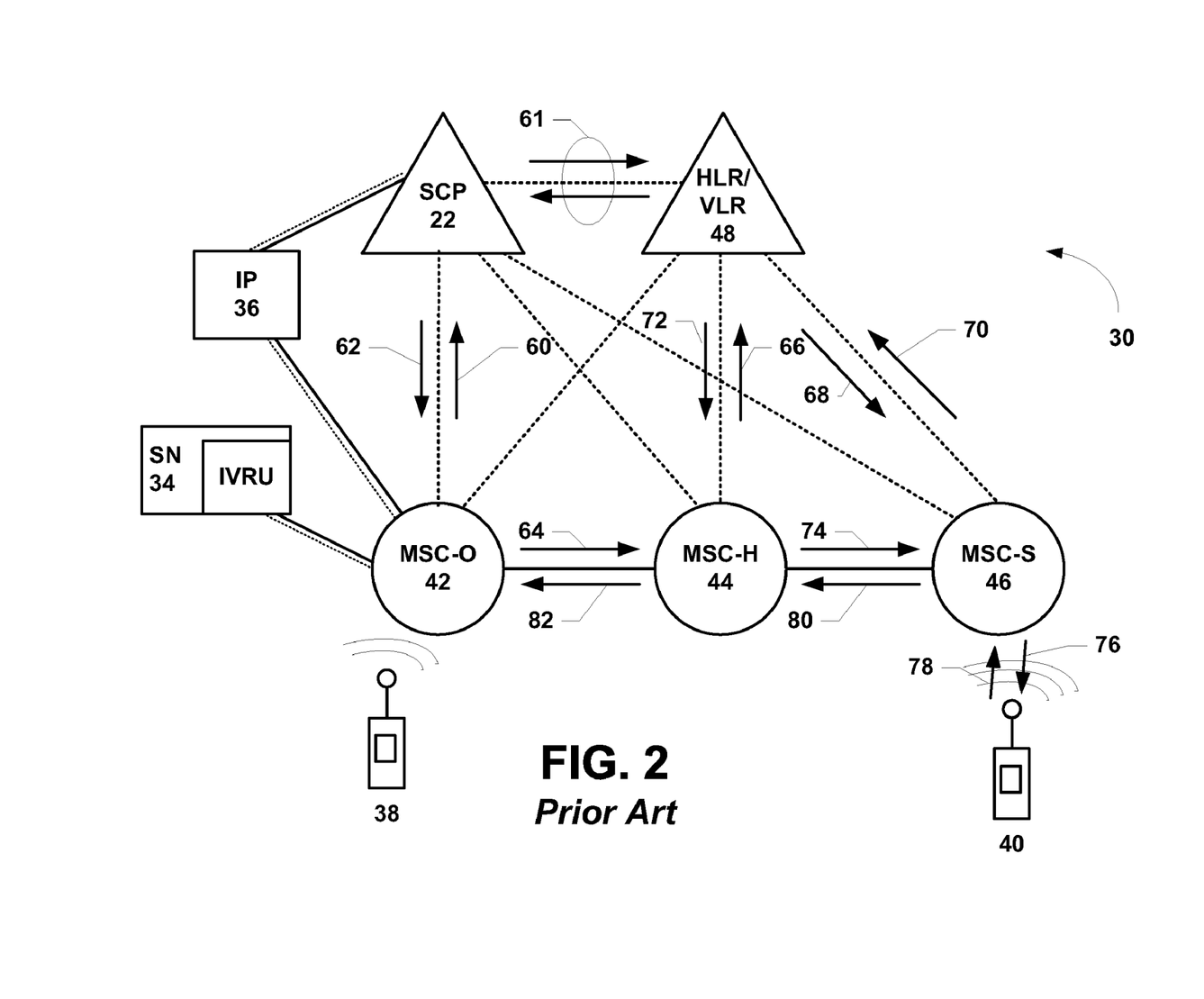
FIG. 2 is a prior art WIN network architecture.

The exemplary network 10 illustrated in FIG. 1 can be implemented in both landline and wireless systems. In the landline environment, the network is referred to as an advanced intelligent network ("AIN"). In the wireless environment, the network is referred to as a wireless intelligent network ("WIN"). An example of such a WIN system architecture 30 is shown in FIG. 2. The principal difference is that, in a landline system, station 12 is directly connected to SSP 16, whereas, in a wireless system, station 40 is a mobile station ("MS") that communicates via radio waves with a base station ("BS") (not shown) and in turn with SSP (referred to as a mobile switching center 46 ("MSC")).

With reference to FIG. 2, MSCs 42, 44, 46 are similar, but may perform different functions for a particular MS 40 and for a particular call. For instance, MSC-O 42 is the originating MSC that first receives a call intended for MS 40. From the dialed digits, MSC-O 42 determines that the call should be routed to the home MSC, MSC-H 44, for MS 40. The MSC-H 44 will determine that MS 40 is presently registered with the serving MSC, MSC-S 44.

Another difference between the WIN network 30 of FIG. 2 and the AIN network of FIG. 1 is that a wireless network utilizes a Home Location Register ("HLR") and a Visitor Location Register ("VLR"), shown as HLR/VLR 48, to manage information such as the profile for the MSC. When the MS registers in a MSC, the MSC sends a REGNOT (Registration Notification) message to the HLR and the HLR will send the profile information for the MS back to the MSC. The MSC will store the information in its VLR (Visitor Location Register). regarding the MS 40, including, respectively, information regarding which MSC is the home MSC, and which MSC is presently serving the MS ("serving MSC" or "MSC-S"). The VLR is updated, for example, whenever a MS registers with the network or is deactivated (powered off). The MSC-S sends an update to the VLR containing the MSC-S's identity (MSC-ID).

In addition, other differences in operation exist between landline and wireless intelligent networks, due largely to differences in industry standards for the two environments. AIN standards are currently embodied in Bellcore's AIN Release 0.1 and AIN Release 0.2, while WIN standards are currently embodied in Telecommunications Industry Association ("TIA") interim standard IS-771 (which is based on other industry standards, including interim standard IS-41, now known as ANSI/TIA/EIA-41-D, for instance.) Each of these standards is fully incorporated herein by reference.

To set up a call to a MS 40, MSC-O 42 first signals the SCP 22 with TCAP message 60 and response message 62 to determine which MSC is the home MSC corresponding to the mobile identification number ("MIN", which is related to the NPA-NXX-XXXX of the dialed MS 40), and the call is routed to MSC-H 44 as shown by IAM message 64. Note that the SCP 22 may query the HLR/VLR 48 to determine the identity of MSC-H 44. The MSC-H 44 then sends a location request message 66 (LOC_REQ) to the HLR/VLR 48 to obtain routing information for the serving MSC. If the MS is serviced by the home MSC, ie, the MS is not travelling to another MSC, the HLR will send back a loc_req r.r. message back to the home MSC.

On the other hand, if the MSC is not serviced by the home MSC, but is travelling to another MSC (ie, another serving MSC) upon receiving the LOC_REQ message, the HLR/VLR 48 sends a route request message 68 (ROUTE_REQ) to the MSC-S 46 through the IS-41 network, and the serving MSC, MSC-S 46, responds with a route req r.r. message 70 containing a routing information alias known as a temporary location directory number ("TLDN"), which is passed to the HLR. The MSC-S 46 also creates a record matching the TLDN to the MIN of MS 40. The HLR/VLR 48 then sends the TLDN to the requesting home MSC, MSC-H 44, in a loc_req r.r. response message 72. MSC-H 44 generates an ISUP message 74 to MSC-S 46 using the TLDN. The MSC-S 46 performs a translation of the ISUP and determines that the MS is in the area served by MSC-S 46. The serving MSC sends back to the home MSC an ACM message. The MSC-S 46 then sends a page 76 to the MS 40, and from the MS's response 78, MSC-S 46 obtains the current cell/sector information, described in further detail below. ACM messages 80 and 82 indicate routing is complete, and the call is then established between the MSC-O 42, the MSC-H 44 and the MSC-S 46.

In a typical cellular radio communications system (wireless telecommunications network), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) for instance. The MSC may then be coupled to a telecommunications network such as the PSTN (public switched telephone network) or the Internet.

When a mobile station (MS) (such as a cellular telephone, pager, personal digital assistant (PDA) or appropriately equipped portable computer or computing device, for instance) is positioned in a cell, the MS communicates via an RF air interface with the BTS antenna of the cell. Consequently, a communication path is established between the MS and the telecommunications network, via the air interface, the BTS, the BSC and the MSC.

With the explosive growth in demand for wireless communications, the level of call traffic in most cell sites has increased drastically over recent years. To help manage the call traffic, most cells in a wireless network are usually further divided geographically into a number of sectors, each defined respectively by radiation patterns from directional antenna components of the respective BTS, or by respective BTS antennae. These sectors (which can be visualized ideally as pie pieces) can be referred to as "physical sectors," since they are physical areas of a cell site. Therefore, at any given instance, an MS in a wireless network will typically be positioned in a given physical sector and will be able to communicate with the telecommunications network via the BTS serving that physical sector.

In addition, both AIN 10 and WIN 30 may include a service node ("SN") 34, which can provide voice and other interactions with users and can facilitate and perform various enhanced services for the switch. For this purpose, SN 34 may contain programmed service logic, which SN 34 may execute in response to messages received from SSP 16 or MSC 42, 44, 46. In addition, SN 34 may contain an Interactive Voice Response Unit ("IVRU") or other hardware and software to facilitate interaction with users, such as playing announcements, collecting dual-tone multi-frequency ("DTMF") digits, and recognizing speech. As shown in FIGS. 1 and 2, a service node such as SN 34 is typically connected to a switch. Consequently, the network may include many service nodes, each programmed to perform the same or similar services for its respective switch.

Exemplary networks 10 and 30 include an intelligent peripheral ("IP") 36, to which SSP 16 (or MSC 42) and SCP 22 are connected, possibly through one or more STPs. Like SN 34, IP 36 can connect to an AIN call and can be arranged to provide assorted services, including tone generation, voice recognition, playback, compression, call control, recording, and DTMF detection and collection. IP 36 may similarly include an IVRU (not shown) to facilitate various interactions with users. IP 36 can be connected to one or more SSPs and is designed to be application-independent, supporting generic services for more than one application. Unlike SN 34, IP 36 does not have call control logic embedded and must be instructed to perform each operation under the control of SCP 22 using a TCP/IP communication path to SCP 22 and the Bellcore defined SR-3511 ISCP-IP Interface Specification. This standard is fully incorporated herein by reference.

In wireless telecommunication networks, it is not uncommon for a subscriber to misplace or lose their mobile station. In the event that the mobile is lost, there is typically no recourse other than to call the MS in the hopes that someone has found it, answers the call, and informs the subscriber where the MS is located. Newer generations of wireless networks may include mobile positioning centers ("MPC") and position determining equipment ("PDE") that can assist in locating a mobile device, but no such assistance is available for legacy networks. What is needed is a method of locating a lost or misplaced MS in legacy networks without the use of an MPC or PDE.

SUMMARY OF THE INVENTION

The present invention provides a mechanism to locate a lost or misplaced powered-on idle mobile telecommunication device, or mobile station, using the existing wireline and wireless telecommunication infrastructure, without the need for advanced positioning equipment such as an MPC or PDE.

In accordance with an aspect of the invention, a user may dial a designated number, enter the phone number of the misplaced or lost mobile, and the network responsively plays a message to the user informing the user of the geographic location of the cell and sector, typically including city and state information, as well as boundary information of the sector, such as street boundaries. In an alternative embodiment, a user may input the MIN of the lost mobile to a web-based form, and thereby retrieve a map of the cell-sector location of the MS.

In another aspect of the invention, a service node (SN) is configured to receive a request from a user trying to locate a mobile device. The SN either prompts the user to provide the phone number of the mobile device via an IVRU or through a web-based form sent to a web server connected to the SN. The SN then initiates a call to the mobile device. The standard network processing of such a call includes sending a facilities available (FAVAIL) message to the service control point (SCP). The SCP identifies the call as a request to locate a mobile, and responsively provides location information to the calling SN. The SN in turn provides the location information to the user either by playing a voice message corresponding to the location information or by instructing a web server to provide a textual or aural description, or a map of the location to the user over the world wide web. In alternative embodiments, the request to locate a mobile may be sent directly to the SCP or other intelligent network node, such as an intelligent peripheral node (IP), without the involvement of the SN. In any case, a network node receives the necessary data.

In one embodiment, the method includes the steps of receiving a request at a service node to locate a mobile; initiating a call from the service node to the mobile; processing the call by sending an FAVAIL message to a service control point; identifying the call at the service control point as originating from a service node, and responsively forwarding the location information to the service node; and providing the location information to the user.

In further embodiments, the method includes an authentication step to ensure that only authorized users are able to obtain location information.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF THE PREFERRED EMBODIMENT

Figure 3:
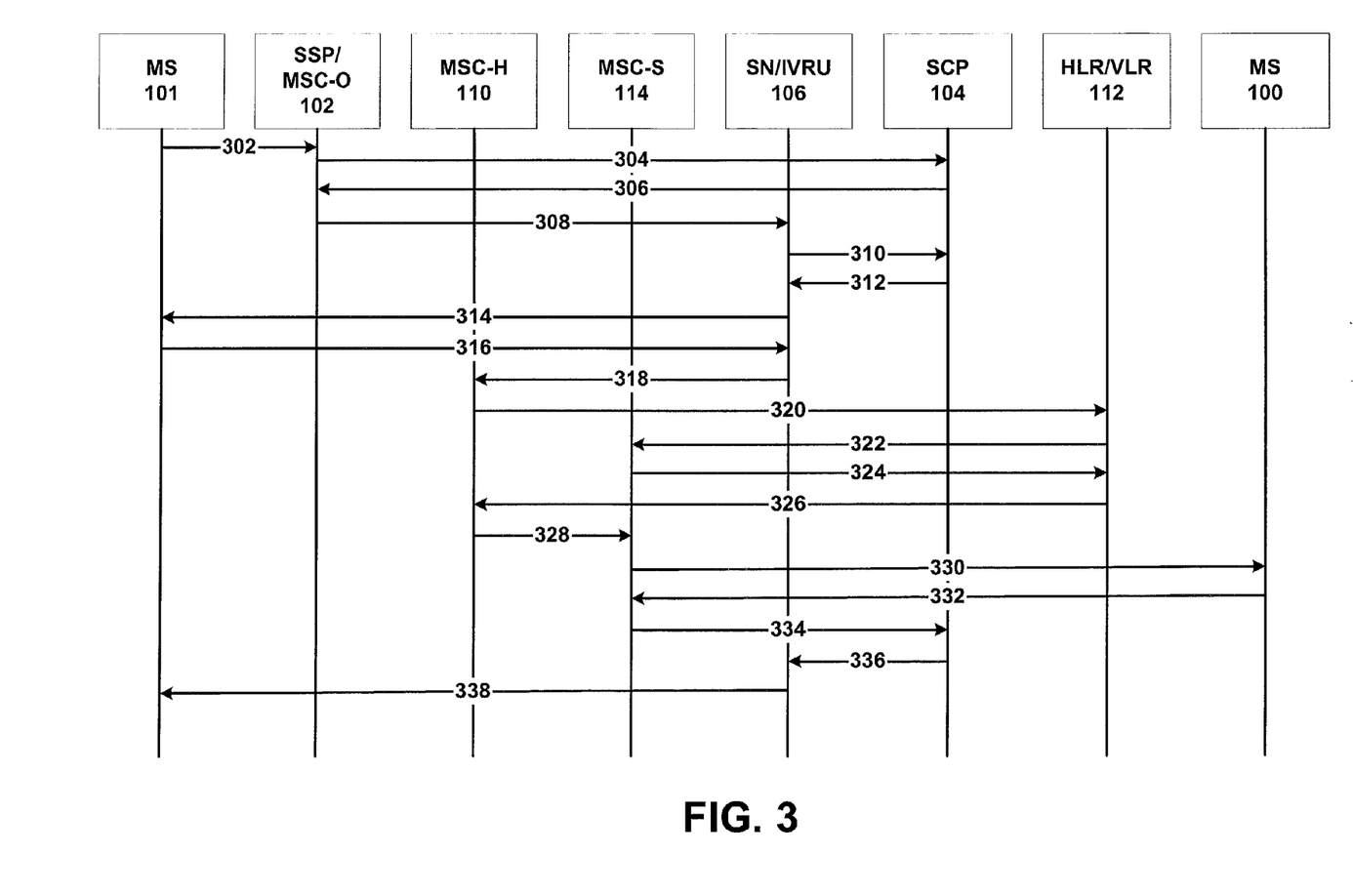
FIG. 3 is a call flow diagram depicting one embodiment of the method of locating a mobile station.

With reference to FIG. 3, one embodiment of the method of locating a mobile station will be described. The service provider preferably makes available a phone number to call to initiate services for locating mobile station (MS) 100. The call 302 is first processed by the switch serving the user device 101, and may be in the form of an SSP (or MSC) 102. The SSP 102 queries the SCP 104 for instructions on handling the call with message 304. The SCP 104 responds with a message 306 that the call should be terminated at the service node (SN) 106. SN 106 receives the call as indicated by message 308 and in turn, also queries the SCP 104 using a Bellcore SR 3511 message 310 for instructions on call processing. Via message 312, the SCP 104 instructs the SN 106 to initiate a message playback utilizing IVRU component of SN 106. The message 314 preferably prompts the user to input the phone number of the mobile station using the DTMF keypad. Alternatively, the IVRU 108 may utilize voice recognition technology to obtain the MS phone number from the user. The digits are received as indicated by message 316.

After the SN 106 has obtained the phone number of the MS, the SN 106 initiates an outbound call to the MS. The outbound call is routed as shown by message 318 to the home MSC-H 110 of the MS. Typically, this is done by determining which MSC serves the particular NPA-NXX-XXXX of the MS 100. This may be done by the SN 106 querying the SCP 104 (not shown). The home MSC-H 110 then queries the HLR 112 with a location request message 320 (LOC_REQ) to determine where the MS is currently registered. The HLR 112 has access to the MSC-ID of the serving MSC-S 114. The HLR 112 sends a routing request 322 to the serving MSC 114, and the serving MSC 114 responds with a routing alias in the form of a TLDN in message 324. The HLR 112 forwards the TLDN to the home MSC-H 110 in message 326, thereby allowing the home MSC-H 110 to initiate an ISUP message 328 to the MSC-S 114.

The MSC-S 114 processes the ISUP message and determines that the MS 100 is within its service area and is in fact registered with MSC-S 114. MSC 114 then pages the MS 100 in paging message 330. The response 332 by the MS 100 to the paging provides updated information regarding the cell and sector information of the MS 100.

In a preferred embodiment, the MSC-S 114 identifies the calling number as corresponding to SN 106. In response to this triggering event, the MSC-S 114 initiates a facilities selected and available (FAVAIL) message 334 to the SCP 104. The FAVAIL message 334 preferably includes the MIN parameter identifying the MS (which is derived from the mobile station's ten digit telephone number), TRIGTYPE indicating which trigger criteria was satisfied, and Location Area ID indicating the current cell and sector of the MS, and the calling number. The FAVAIL message 334 may include other information regarding the current state of the call.

Based on the information contained in the FAVAIL message 334, the SCP 104 determines that the call was initiated by SN 106 in order to obtain location information for the MS. The SCP 104 responsively provides the cell and sector ID and the MIN to the SN 106 in message 336. The SN 106 then queries a database for a voice description corresponding to the cell and sector ID, and plays the message 338 back to the user at device 101 using IVRU of SN 106. Preferably, the message played to the user informs the user of the geographic location of the cell and sector, typically including city and state information, as well as boundary information of the sector, such as street boundaries. Alternatively, the message may indicate the centroid of the cell and/or sector, and may further include a distance indicating the range of possible locations, such as "within 1500 feet of the intersection of Main Street and First Avenue." In an alternative embodiment, a user may input the MIN of the lost mobile to a web-based form, and thereby retrieve the location information over the web. The location information may be a textual description (transported with http or other suitable transport protocol), an aural description (contained in, e.g., a .wav file, an RTP data stream having G.711 or G.723.A codec data, or other suitable audio format and transport method), or in the form of a map of the cell-sector location of the MS.

In an alternative embodiment the lost mobile device MS 100 has a trigger added as part of its profile. The trigger is called "Terminating Resource Available". The trigger is preferably added through the provisioning stream to the HLR. The trigger information is downloaded to MSC-S 114 when MS 100 initially registered in MSC-S 114. After the MS 100 responds to the page, MSC-S 114 determines that the trigger criteria are met and responsively generates a FAVAIL message and sends it to SCP 104.

In yet another alternative embodiment, the trigger is provisioned temporarily for the purpose of locating a lost mobile device. After the lost mobile is located, the trigger is preferably removed to prevent unnecessary traffic to SCP 104. In other embodiments a mobile station may already have a Terminating Resource Available trigger assigned to it for, e.g., other enhanced services. In such a case, it is unnecessary to add an additional trigger. In an alternative embodiment, the SN provides an authentication step to ensure only authorized users can access location information for a given MS. Preferably, IVRU of SN 106 prompts the user at station 101 to enter a password or PIN. The PIN may be that associated with the account data corresponding to MS 100. The SN 106 preferably queries an account database (such as a P2K database for Sprint PCS, not shown) to obtain the PIN, and then verifies the PIN obtained from the user via IVRU of SN 106.

Figure 4:
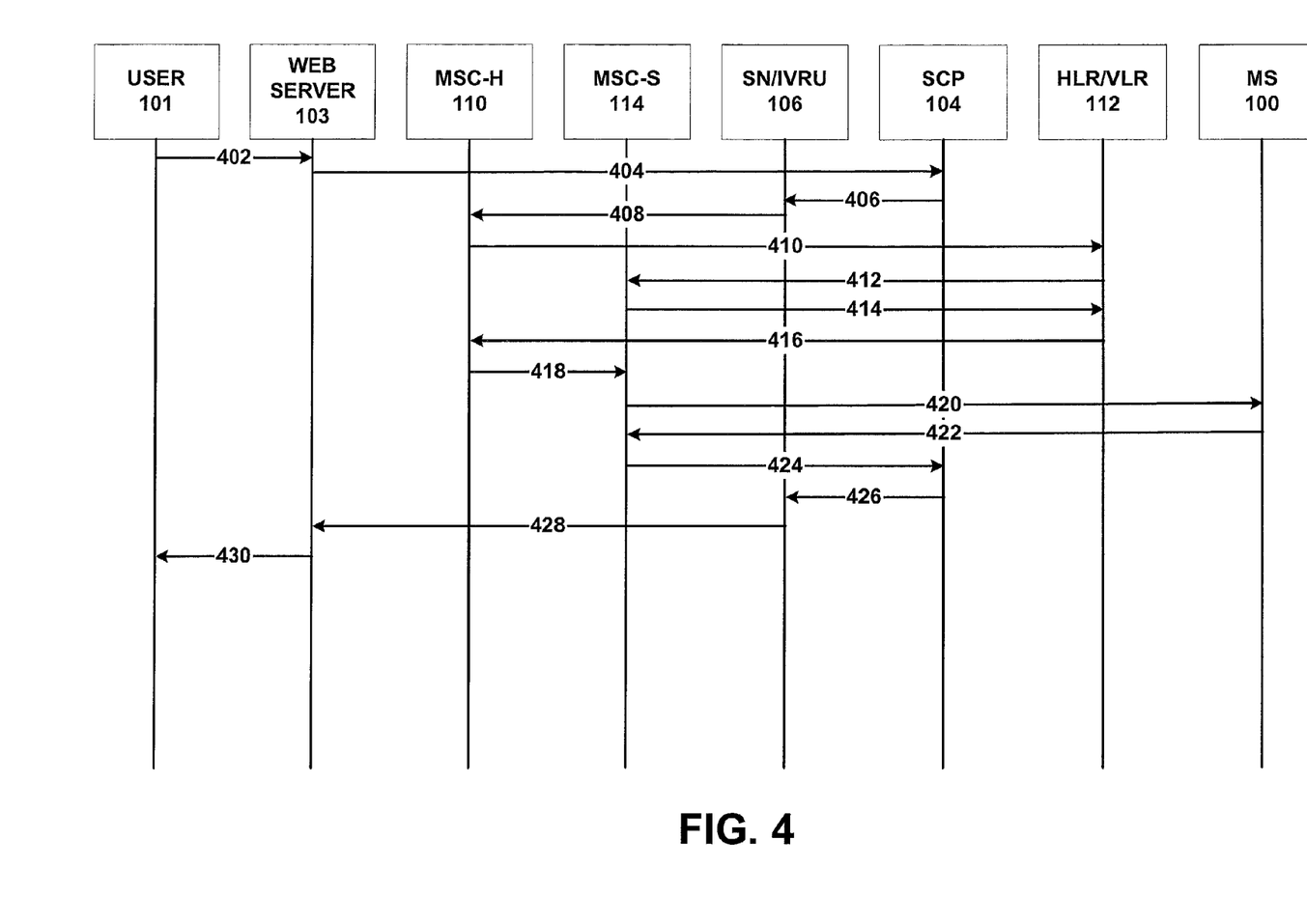
FIG. 4 is a call flow diagram depicting an alternative embodiment of the method of locating a mobile station.

With reference to FIG. 4, an alternative embodiment using a web-based interface is described. User 101 may access the internet or other IP network using any one of a number of devices, including a personal computer, a mobile computing device such as a mobile phone with IP capabilities, a personal digital assistant (PDA) or other device. The fact that additional communication sessions and associated call set-up procedures might be necessary to establish the connection between user 101 and a suitable IP network is understood, and not shown in FIG. 4. The user 101 is able to access the web server 103 and request to view a web page. As is know to one of skill in the art, the web page may be served to user 101 using any number of formats, such as html, active server pages (asp), java, etc. The data is preferably transmitted according to the hyper-text transfer protocol (http) in conjunction with protocols generally associated with internet data transfers. The protocols are typically referred to as the TCP/IP suite of protocols.

Figure 5A:
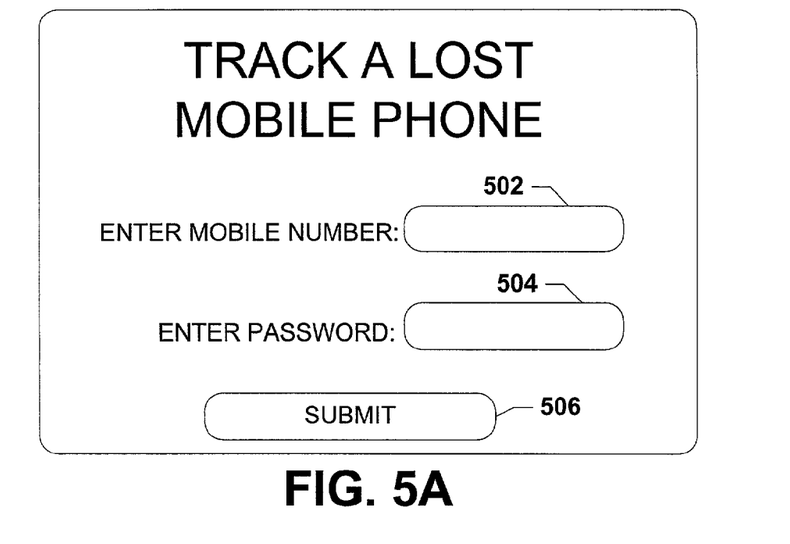
FIGS. 5A and 5B are exemplary web interfaces.
Figure 5B:
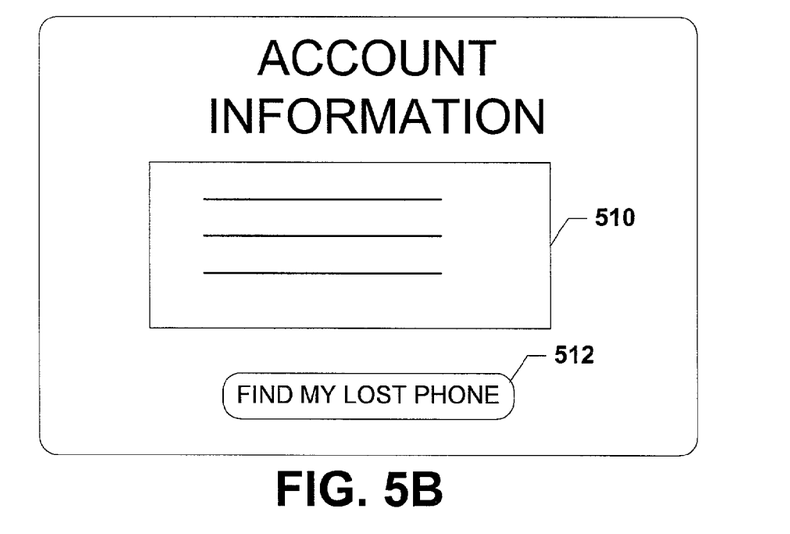

In FIG. 4, the user 101 initiates a request 402 to locate a mobile station MS 100. In one embodiment, the web server 103 provides an authentication step (not shown) to ensure only authorized users can access location information for a given MS. Preferably, the web server queries an account database containing each MIN and a password associated with it. FIGS. 5A and 5B depict suitable web-accessible user interface for providing the phone number of the MS 100. FIG. 5A provides data entry areas 502 and 504 for entering the mobile phone number and an account password, respectively, and a submit button 506, to initiate message 402. This may be an http "POST" operation or other suitable data submission operation. FIG. 5B shows a screen that is made available to a user after having already logged in to the mobile's account. For example, account data may be provided in section 510, and a selectable icon or hyperlink representing a service request object 512 may be provided to initiate message 402. In this case, the web server 103 already has access to the mobile phone number and password from the prior login procedure.

SCP 104 preferably includes an IP interface such that it can communicate directly with web server 103. One such exemplary IP interface is called the Open Service Gateway (OSG) as implemented by SCPs available from Telcordia. With the OSG interface to the SCP, Web Server 103 may run a client side application that can invoke a service side application on SCP 104. In message 404, web server 103 may relay the MIN for MS 100 to the SCP 104, along with a request to locate the MS 100.

Alternatively, the web server 103 may communicate with the SN 106, and the SN 106 may relay the necessary information, including the MIN, to the SCP, thus having the SN 106 act essentially as a relay for the MIN payload information of message 404. Preferably, both the SN 106 and SCP 104 are accessible over an IP (internet protocol) infrastructure.

In either embodiment, the SCP 104 in turn instructs SN 106 to initiate a call to the lost mobile MS 100, passing the MIN to SN 106 in message 406. This may be done through the existing SR-3511 interface as defined by Telcordia. Messages 408, 410, 412, 414, 416, 418, 420, 422, 424, and 426 all take place as indicated above with respect to FIG. 3, messages 318 through 336, respectively.

In an alternative embodiment where the SCP 104 communicates directly with web server 103, messages 426 and 428 may be replaced with a single message providing the location information directly to the web server 103.

Figure 6:
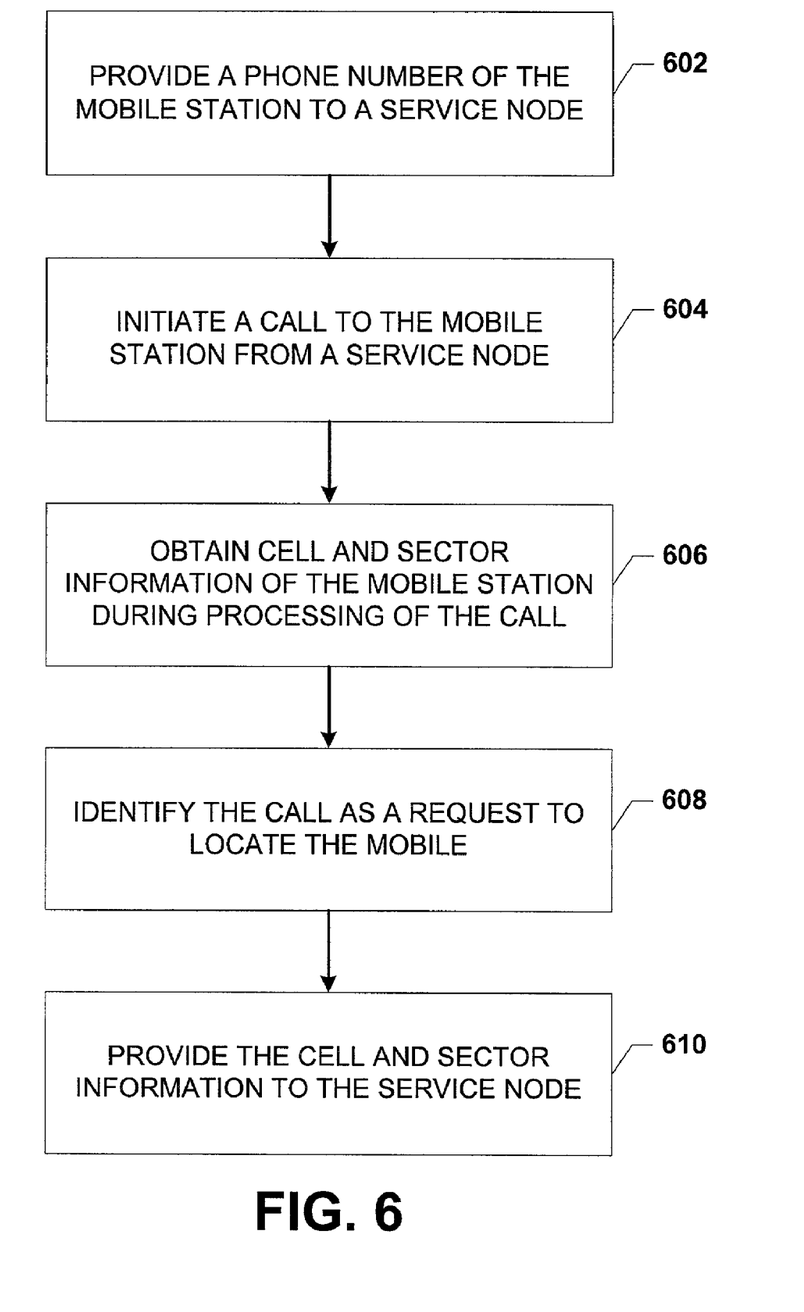
FIG. 6 is a flowchart of a preferred embodiment of locating a mobile station.

The flowchart of FIG. 6 depicts the steps performed by a preferred embodiment for locating a lost mobile station. At step 602, the phone number of the mobile station is provided to the service node 106. The number may be in the form of ASCII characters provided to the SN 106, or may be in the form of the MIN. The mobile number may be collected by the SN 106 by way of an IVRU system where the caller is prompted to enter the MS's number. The IVRU may then collect digits by way of DTMF tones or by voice recognition. Alternatively, the SN may be given the mobile number by way of a web interface. The web interface may include a web server having access to either the SN or the SCP or other suitable network element, such as an IP node 36 as shown in FIGS. 1 and 2. The web server may collect the mobile number directly from a user via a web-based form, or from a separate database containing data associated with the user account.

At step 604 the SN 106 initiates a call to the mobile station. During the course of processing this call, at step 606 the SCP obtains updated cell and sector information of the mobile station. Typically, this is done by examining the content of an FAVAIL message send from the MSC-S to the SCP. At step 608 the call is identified as being a request to locate the mobile. Preferably this is determined by examining the calling number to see whether it corresponds to a SN. Finally, at step 610, the cell and sector information is provided to the SN 106. The SN 106 may then relay the information to the user via an IVRU at the SN 106. Alternatively, the SN 106 may provide the information to the user via web server 103. The information may be presented graphically, verbally (a .wav file or other audio file, or VoIP format for playback on a VoIP client), or in a textual format.

Exemplary embodiments of the present invention have been described above. Those skilled in the art will understand, however, that changes and modifications may be made to these embodiments without departing from the true scope and spirit of the present invention, which is defined by the claims.

We claim:

1. A method of locating a mobile station comprising the steps of:

providing a phone number of the mobile station to a service node;

initiating a call to the mobile station from the service node including the steps of receiving a routing alias from a serving Mobile Switching Center (MSC), and transmitting an Integrated Services Digital Network User Part (ISUP) message to the serving MSC based on the routing alias;

obtaining cell and sector information of the mobile station during processing of the call;

identifying the call at the serving MSC as a request to locate the mobile based on the ISUP message;

sending a facilities available message containing location information from the MSC to a service control point; and providing the cell and sector information to the service node.

2. The method of claim 1 wherein the step of providing a phone number of the mobile station comprises the steps of:
playing a message from the service node requesting the phone number of the mobile station; and
receiving Dual Tone Multi-Frequency tones corresponding to the mobile station's phone number; and
translating the DTMF tones into dialed digits.

3. The method of claim 1 wherein the step of providing a phone number of the mobile station is performed by a web-based interface.

4. The method of claim 1 wherein the step of providing a phone number of the mobile station comprises the steps of:
transmitting a web form having a mobile phone number field to a web-based interface; and
receiving the phone number of the mobile station via a submission from the web-based interface.

5. The method of claim 1 wherein the step of providing a phone number of the mobile station comprises the steps of:
obtaining user account information;
transmitting a web form having a service request object;
receiving an indication that the service request object was selected;
querying a database for the mobile phone number field corresponding to the user account information; and
receiving the phone number of the mobile station in response to the query.

6. The method of claim 1 wherein the step of providing the cell and sector information comprises sending the cell and sector information from the service control point to the service node.

7. The method of claim 1 further comprising the step of provisioning a Terminating Resources Available trigger, and wherein said step of sending a facilities available message is responsive to said trigger.

8. The method of claim 7 further comprising the step of un-provisioning the Terminating Resources Available trigger.

9. The method of claim 1 further comprising the steps of:
querying a database for a message corresponding to the cell and sector information; and
playing the message to a user.

10. The method of claim 9 wherein the message includes city and state information.

11. The method of claim 1 further comprising the steps of:
querying a database for a graphic image corresponding to the cell and sector information; and
transmitting the graphic image to a user.

12. The method of claim 1 further comprising the step of authenticating a user.

13. The method of claim 1 where the phone number is a MIN.

14. The method of claim 1 where the phone number is of the form Numbering Plan Area (NPA)-NXX-XXXX.

15. A method of locating a mobile station comprising the steps of:
providing a phone number of the mobile station to a network node;
initiating a call to the mobile station from a service node, including the steps of receiving a routing alias from a serving MSC, and transmitting an ISUP message to the serving MSC based on the routing alias;
obtaining cell and sector information of the mobile station during processing of the call;
identifying the call at the serving MSC as a request to locate the mobile based on the ISUP message;
sending a facilities available message containing location information from the MSC to a service control point; and
providing the cell and sector information to a user.

16. The method of claim 15 wherein the network node is an intelligent peripheral node.

17. The method of claim 15 wherein the network node is a service control point node.

18. The method of claim 15 further comprising the step of authenticating a user.

* * * * *